Feb. 21, 1967          M. H. GROVE          3,305,213
VALVE CONSTRUCTION
Filed Aug. 16, 1965
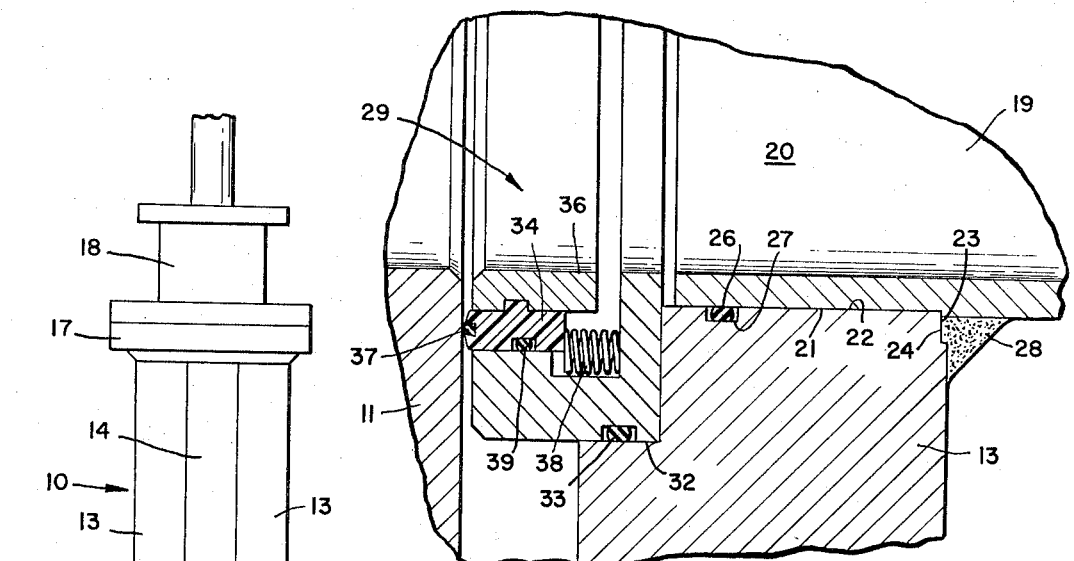
FIG_2
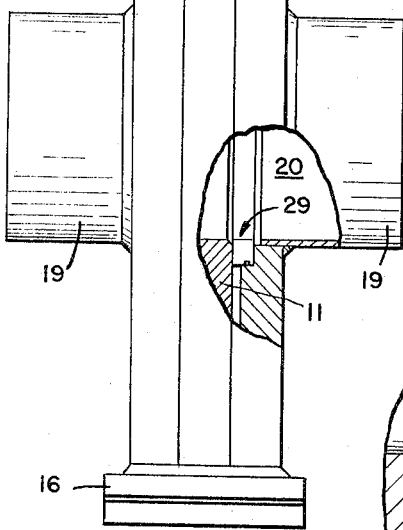
FIG_1
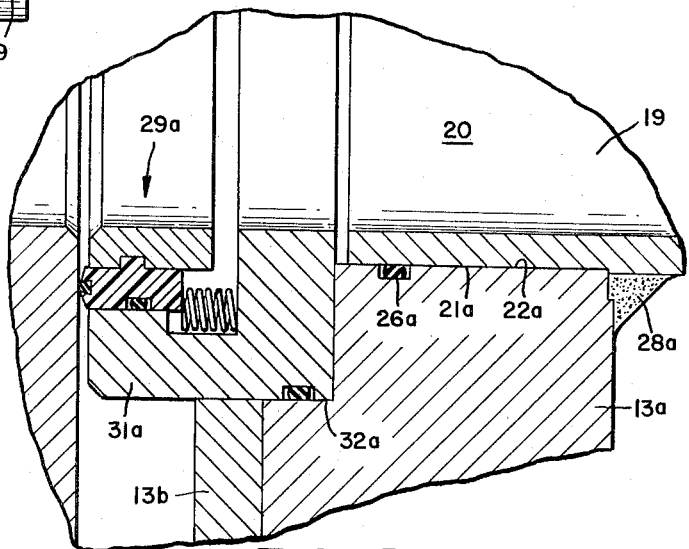
FIG_3
INVENTOR.
MARVIN H. GROVE
BY
ATTORNEYS

United States Patent Office 3,305,213
Patented Feb. 21, 1967

3,305,213
VALVE CONSTRUCTION
Marvin H. Grove, 340 Hillside Ave.,
Piedmont, Calif. 94611
Filed Aug. 16, 1965, Ser. No. 479,976
1 Claim. (Cl. 251—328)

This application is a continuation-in-part of my copending application Serial No. 339,706, filed January 23, 1964, now Patent No. 3,279,747, for "Valve Construction," which in turn referred to my copending application Serial No. 253,416 filed January 23, 1963 (now abandoned). The invention relates generally to valves of the gate type such as are suitable for controlling flow of gases and liquids, and particularly to valves having fabricated steel bodies.

In the past a number of commercial valves have been manufactured with bodies fabricated from steel shapes such as channels, angles, plates and the like. Generally the bodies are rectangular in section or box-like, with aligned hubs welded to the end walls. It has been thought desirable to form the hubs as steel castings with relatively heavy walls, and the welds to the end walls have been relatively heavy, involving many passes in a circular welding machine. The objective has been to make the circular weld connections between the hubs and the end walls a structural part to carry stresses between the hubs and the body, and at the same time to prevent leakage between these parts. Theoretically, it is desirable to use ordinary steel pipe sections in place of relatively heavy cast metal hubs, and corresponding to the piping with which the valve is to be used. However, this presents certain problems, particularly in that it requires weld connections between the pipe sections and the body which will hold the line pressures applied and at the same time take the stresses applied to the body from the associated piping with which the valve is connected.

In general, it is an object of the present invention to provide a novel valve construction which permits the use of ordinary steel pipe sections as hubs.

Another object of the invention is to provide a valve construction in which hubs in the form of pipe sections are "body bound" to heavy end walls of the body, without relying upon heavy weld connections.

Another object of the invention is to provide a valve of the above character having means for sealing between the hub sections and the body, without relying upon weld connections.

Additional objects and features of the invention will appear from the following description in which the preferred embodiment has been set forth in detail in conjunction with the accompanying drawing.

Referring to the drawing:

FIGURE 1 is a side elevational view, partly in section, illustrating a valve incorporating the present invention;

FIGURE 2 is a detail in section illustrating the manner in which the pipe sections are attached to the end walls of the valve body; and FIGURE 3 is a cross-sectional view like FIGURE 2 but illustrating another embodiment.

The valve shown in FIGURE 1 is relatively simple and comprises the fabricated body 10 together with the valve gate 11. The gate is of the flat type having parallel valve working surfaces. The valve body can consist of flat steel plates 13 which are secured at their edges to the side walls 14. In place of forming a wall in this manner it will be evident that a suitable box-like body that is rectangular in section can be formed in a variety of ways, as for example, by fabricating channels with plates, angles with plates, and the like. In any event, the construction should provide relatively heavy or massive end walls 13 which may or may not be reinforced by ribbing or the like. The bottom end of the body is shown provided with the closure plate 16, and the upper end is provided with a welded on flange 17, which serves to mount the bonnet assembly 18.

The hubs 19 are in effect steel pipe sections having a wall thickness corresponding to the piping with which the valve is to be used. To prepare the end walls 13 for receiving the pipe sections 19, the openings or flow passages 20 in the end walls 13 are machined to provide the finished cylindrical periphery 21. The cylindrical periphery 22 of the corresponding pipe section is likewise machined to be of a diameter only slightly less than the diameter of the periphery 21. Such machining provides the circular abutment shoulder 23. The exterior face of each wall 13 is machined as indicated at 24 to provide a circular area for accurate abutment with the shoulder 23.

Sealing rings of the resilient O-ring type are provided between each pipe section and the corresponding end wall 13. Thus as shown in FIGURE 2 a resilient O-ring 26 is accommodated within a circular recess 27 formed in the end wall 13. It will be noted that this O-ring is located near the inner end of the pipe section, and in a location spaced axially from the shoulder 23.

After a pipe section has been closely fitted within an end wall in the manner shown in FIGURE 2, a circular weld 28 is applied. The shrinkage of this weld during and immediately after its application serves to slightly expand the adjacent cylindrical portion of the pipe section, thereby tightening the fit between the peripheral surfaces 21 and 22, and in effect bonding the pipe section to the heavy end wall 13.

In actual practice the end walls 13 may be of the order of 1½ inches or more in thickness, and the wall thickness of the pipe sections 19 may range from ⅜ to ¾ inch.

In FIGURE 2, I have shown a sealing assembly 29 carried by the end wall 13 and generally surrounding the flow passage 20. This assembly may consist of a metal mounting ring 31 which is removably fitted within a recess 32 formed in the end wall 13. Leakage between these parts is prevented by the seal 33 of the resilient O-ring type. The mounting ring 31 carries a seal ring 34, which may be made of a relatively hard resilient material like nylon, and which is mounted upon a carrier ring 36. The nylon ring may be provided with a relatively soft resilient insert 37, for making sealing contact with the adjacent gate. The seal ring 34 is shown being urged against the gate by the compression springs 38, and it is sealed with respect to the mounting ring 31 by the resilient O-ring 39. It will be noted that the inner end of the pipe section 19 terminates adjacent to the mounting ring 31, and the opening through the sealing assembly is substantially the same as the opening in the pipe section.

It will be evident from the foregoing that I have provided a relatively simple but highly effective valve construction and one which permits the use of pipe sections instead of relatively heavy cast metal hubs. As previously stated, it is common for gate valves to have the hubs made of relatively heavy metal castings. The hubs which I employ are made of pipe sections corresponding in wall thickness to the piping which the valve is to be connected to. The peripheral surfaces 21 in the relatively massive end walls 13 are dimensioned whereby the pipe sections readily and snugly fit into the position illustrated, and thereafter the pipe sections are secured to the massive end walls by the simple circular weld connection 28, and become virtually body bound.

Ordinarily when a weld is applied about a pipe section, the weld metal itself accommodates stresses applied by internal fluid pressure. In a cylindrical pipe such stresses are ordinarily referred to as hoop stresses. Hoop stresses are such that a relatively heavy wall section is required for a given internal fluid pressure. When a weld is made between such a pipe section and a relatively massive member like the end wall 13, the circular weld is not subjected to hoop stresses. On the contrary, the circular weld directly transmits forces from the cylindrical section to the relatively massive end wall 13, whereby the adjacent portion of the pipe section is reinforced against radial deflection. Although the circular weld transmits force from the pipe section to the massive end wall 13, the relatively heavy and massive character of the end wall is such that it is not subjected to any appreciable stress and it is not deflected to any appreciable extent in carrying the forces applied to the weld connection. Thus, the weld connection is not subject to hoop stress but is subjected to stresses in compression. In addition to the foregoing, the body bound character of the fit between the pipe section and the relatively heavy end wall 13, by virtue of shrinkage of the weld connection 28, makes for adequate transfer of stresses from the pipe section to the massive end wall 13.

The O-ring seal 26 ensures against leakage between each pipe section and the body, and because of the massive character of the end wall 13 and the spacing between the O-ring seal 26 and the weld metal 28, the O-ring is not injured by excessive heating at the time the weld is applied.

In general the features described above make possible the use of relatively light weight hubs made of pipe sections corresponding to the piping with which the valve is to be used. The ability of such pipe sections to withstand internal pressure is actually enhanced by virtue of the weld connection and by virtue of the body bound character of the fit between the pipe sections and the massive end walls. Although the circular weld 28 can be made relatively simple without the use of excessive weld metal, it is adequate to withstand the force applied to the hubs from associated piping.

In the embodiment illustrated in FIGURES 1 and 2, the end walls 13 are made relatively massive and are integral. In some instances the body may be made of relatively lighter walls and the end walls provided with massive steel plates with openings for receiving the pipe sections. Such a construction is illustrated in FIGURE 3. In this instance, in place of the one piece end wall 13, the end wall actually comprises the heavy plate 13a which has been attached to the exterior face of the body wall 13b. These parts are secured together by welding in such a manner as to prevent leakage between them. A sealing assembly 29a has been shown modified with respect to its dimensions, but again the mounting ring 31a of this assembly has been removably fitted within the annular recess 32a formed in the plate 13a. The pipe sections are similarly fitted within the plates 13a and secured thereby by welding 28a. Here again, the peripheral surface 22a becomes body bound with respect to the peripheral surface 21a, and leakage between the pipe section and the body is prevented by the sealing means 26a of the O-ring type.

I claim:

In a valve construction, a valve body comprising substantially flat side and end walls and fabricated from mill steel, the end walls comprising relatively heavy steel plates and having aligned openings to provide flow passages, a valve gate disposed within the body, sealing assemblies carried by said end walls and forming seals between the body and the gate, said sealing assemblies including a metal mounting ring fitted within a recess formed in the corresponding end wall, steel pipe sections closely fitted within the openings of the end walls, the ends of each pipe section terminating adjacent the mounting ring of the corresponding sealing assembly, each pipe section having a circular shoulder forming an abutment stop which engages the exterior face of the corresponding end wall, a weld connection between each pipe section and its corresponding end wall, said weld connection being a circular weld at the junction between the angular shoulder of a pipe section and the exterior face of the adjacent end wall, said circular weld forming a structural connection between walls of the pipe section which are stressed to a substantial degree by internal pressure and the relatively heavy wall which is not stressed to substantial extent by internal body pressure, and a seal of the O-ring type between each pipe section and the corresponding end wall, said seal being spaced axially from the circular weld and being near that end of the pipe section that is adjacent to the sealing assembly.

References Cited by the Examiner

UNITED STATES PATENTS

| 1,708,851 | 4/1929 | Sparks | 251—328 |
| 2,514,532 | 7/1950 | Allen et al. | 251—329 X |
| 2,810,542 | 10/1957 | Bryant | 251—328 X |
| 3,013,769 | 12/1961 | Volpin | 251—327 X |
| 3,044,741 | 7/1962 | Grove | 251—172 |

FOREIGN PATENTS

| 471,417 | 9/1937 | Great Britain. |

M. CARY NELSON, *Primary Examiner.*

A. ROSENTHAL, *Assistant Examiner.*